G. G. BEHN.
VEHICLE FENDER MOUNTING.
APPLICATION FILED NOV. 17, 1919.

1,396,351. Patented Nov. 8, 1921.

INVENTOR:
Guido G. Behn
by Macleod, Calver, Copeland & Dike
Attys.

UNITED STATES PATENT OFFICE.

GUIDO G. BEHN, OF DETROIT, MICHIGAN, ASSIGNOR TO ESSEX MOTORS, OF DETROIT, MICHIGAN, A CORPORATION OF MICHIGAN.

VEHICLE-FENDER MOUNTING.

1,396,351.  Specification of Letters Patent.  Patented Nov. 8, 1921.

Application filed November 17, 1919. Serial No. 338,598.

*To all whom it may concern:*

Be it known that I, GUIDO G. BEHN, citizen of the United States, residing at Detroit, county of Wayne, State of Michigan, have invented a certain new and useful Improvement in Vehicle Fender Mountings, of which the following is a specification, refernce being had therein to the accompanying drawings.

My present invention relates to an improvement in motor vehicles, particularly to mechanism for attaching the fenders or mud guards to the vehicle body. Heretofore, difficulty has been experienced in securing the fenders to the vehicle body, particularly the rear fenders, owing to the fact that variations in the fenders and body occur in the process of manufacture, and these variations make it necessary to force the parts into place resulting in injury or distortion of the parts and in loss of time in assembling. The ordinary method of securing fenders to the vehicle body has been by the use of bolts or cap screws which pass through holes in the edge of the fender. It has been found in practice that it is necessary to make the holes in the fenders in the form of slots to allow for variation, and this requires the use of a large washer under the head of the cap screw. Even so, the fenders frequently have to be sprung and are injured or distorted in assembling.

My invention consists in making the fender without holes for attaching to the body, and in securing it to the body by a clamp or a series of clamps which extend over the edge of the fender. These clamps are arranged at right angles to the edge of the fender which is preferably reinforced and the fender may be moved lengthwise of the reinforced edge for the purposes of adjustment. Furthermore, provision is made to permit the fender to be adjusted in or out from the vehicle body either by providing clamps having slots through which the bolts pass or by providing the clamps with jaws which permit the reinforced edge of the fenders to be moved in and out from the body.

My invention is particularly valuable for use in connection with motor vehicles which are manufactured in large quantities and are assembled on an assembly chain because no fitting of each individual fender is required. All that is necessary is for the workman to put the fender in place and line it up with the edge of the running board and then set up the bolts which secure the clamps to the body.

The invention will be fully understood from the following description when taken in connection with the accompanying drawings, and the novel features thereof will be pointed out and clearly defined in the claims at the close of this specification.

In the drawings, Figure 1 is a side elevation of a vehicle body and fender embodying my invention.

Figure 1:
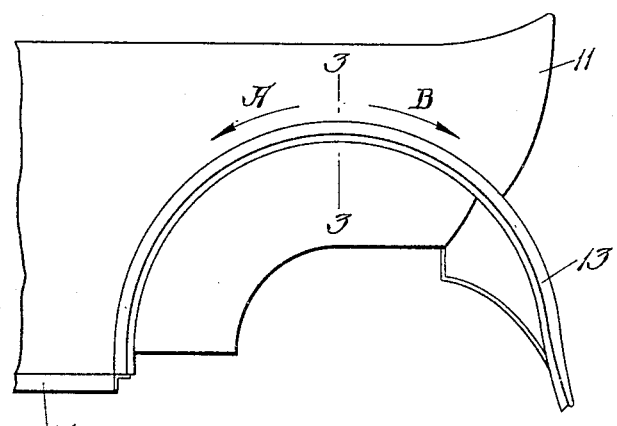
Figure 4:
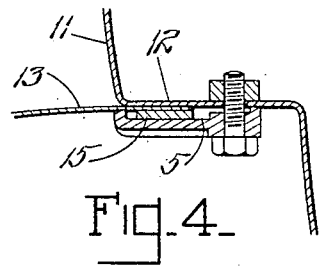
Fig. 4 is a modified form of clamp.
Figure 3:
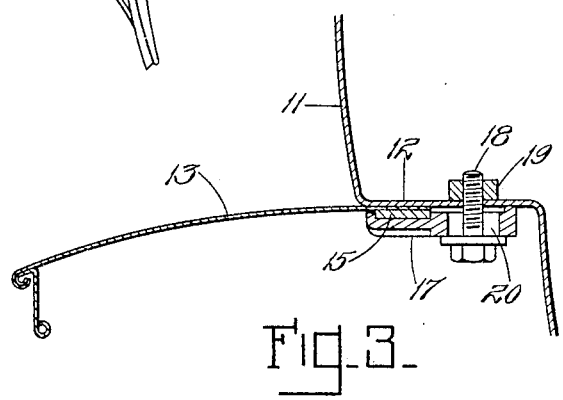
Fig. 3 is a section on line 3—3 of Fig. 1.
Figure 2:
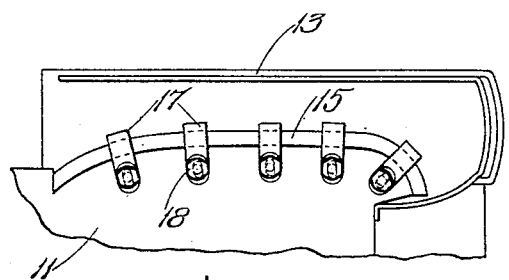
Fig. 2 is a bottom plan view of the parts shown in Fig. 1.
Figure 5:
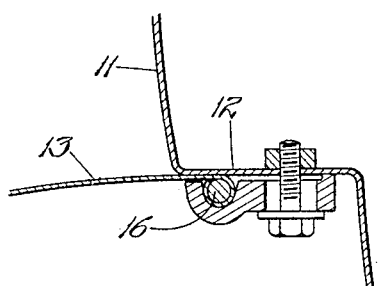
Fig. 5 shows another form of clamp and fender.
Figure 6:
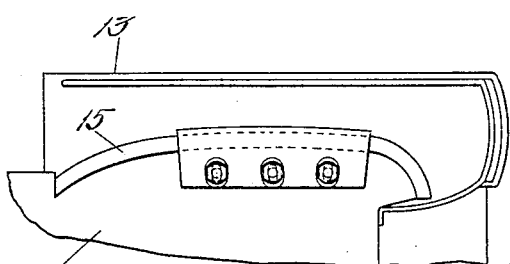
Fig. 6 shows a form of clamp which can be used where a single clamp is to be employed.

Referring now to the drawings, at 11 is shown the vehicle body having the ordinary space 12 on the side known as the wheel-house. The fender is designated 13 and extends under the wheel-house. The running board is shown at 14. The fender is provided with a reinforced edge 15 which may be a strip spot-welded to the fender or a wire, as shown at 16 in Fig. 5, rolled into the edge of the fender in the well-known manner. At 17 is shown a series of clamps secured to the under side of the wheel-house by a bolt 18 and nut 19. These clamps in my preferred form (see particularly Fig. 3) have slots 20 through which the bolts 18 pass and permit the clamp to be adjusted in or out from the vehicle body. The end of the clamp in my preferred form is constructed to fit closely over the reinforcing 15 on the edge of the fender. This construction allows for any ordinary variation in the relation of the fender and running board or fender and body. In Fig. 4 I have shown a clamp adapted to fit over the reinforced edge of the fender in such manner as to allow for sidewise variation, the clamp itself being rigidly attached to the vehicle body. This is accomplished by providing the clamp with a slot 5 which is of a greater width than the reinforcing 15. In Fig. 5, I have shown a clamp adapted to fit over the edge of the fender reinforced by an inclosed wire. The clamps lie at right angles to the reinforced edge of the fender and therefore permit movement of the fender in the direction of the arrows A and B in Fig. 1. In attaching the fender, the fender is secured first to the running board and lined up with it and then the bolts 18 holding the clamps 17 are tightened up. This secures the fender in the correct position without any fitting or straining of the fender and with an expenditure of a very small amount of labor. In Fig. 6, I have shown a single long clamp for the fender which may be more convenient under certain conditions.

What I claim is,

1. In combination, a sheet metal fender, a vehicle body, and a clamp mounted on the vehicle body at one side of the fender, a bolt for securing said clamp in place, said clamp extending transverse to the length of the fender and overlapping the edge of the fender and thus serving to secure the latter in place without passing the securing bolt through the fender.

2. In combination, a sheet metal fender, a vehicle body having a wheel-house, and a plurality of clamps spaced apart from each other, and bolts for securing said clamps to said wheel-house at one side of the fender, said clamps extending transverse to the length of said fender and overlapping the edge of the fender and thus serving to secure the latter in place without passing said bolts through the fender.

3. In combination, a sheet metal fender having an edge provided with an attached reinforcement rigid therewith, a vehicle body having a wheel-house, clamps rigidly engaging said reinforcements and extending transverse to the length of the fender, and bolts for securing said clamps to said wheel-house, said clamps engaging said reinforcement and overlapping the inner edge of the fender to secure said fender in place without passing said bolts through the fender.

4. In combination, a sheet metal fender having an edge provided with a reinforcement which is rigid therewith, a vehicle body having a wheel house, and a clamp extending transverse to the length of the fender and mounted on said wheel-house at one side of said fender, means for securing said clamp to said wheel-house, said clamp extending over the edge of said fender and engaging said reinforcement to secure said fender in place without passing said securing means through the fender, while permitting adjustment of the fender lengthwise of said edge.

5. In combination, a sheet metal fender having an edge provided with an attached reinforcement rigid therewith, a vehicle body having a wheel-house, clamps rigidly engaging said reinforcements and extending transverse to the length of the fender, said clamps engaging said reinforcement and overlapping the inner edge of the fender to secure said fender in place without passing said bolts through the fender, said clamps being constructed to permit adjustment of the fender in and out relative to the wheel-house.

In testimony whereof I affix my signature.

GUIDO G. BEHN.